US010412956B1

(12) United States Patent
Vanselow et al.

(10) Patent No.: US 10,412,956 B1
(45) Date of Patent: Sep. 17, 2019

(54) DUAL HEADED WILDFOWL DECOY

(71) Applicant: Avery Outdoors, LLC, Springdale, AR (US)

(72) Inventors: Matt Vanselow, Independence, OR (US); Eric Larsgaard, Canton, SD (US)

(73) Assignee: Avery Outdoors, LLC, Springdale, AR (US)

( * ) Notice: Subject to any disclaimer, the term of this patent is extended or adjusted under 35 U.S.C. 154(b) by 161 days.

(21) Appl. No.: 15/684,630

(22) Filed: Aug. 23, 2017

Related U.S. Application Data

(60) Provisional application No. 62/379,000, filed on Aug. 24, 2016.

(51) Int. Cl.
*A01M 31/00* (2006.01)
*A01M 31/06* (2006.01)
*A01M 29/06* (2011.01)

(52) U.S. Cl.
CPC ............ *A01M 31/06* (2013.01); *A01M 31/00* (2013.01); *A01M 29/06* (2013.01)

(58) Field of Classification Search
CPC ....... A01M 31/06; A01M 31/00; A01M 29/06
USPC ............................................................ 43/2
See application file for complete search history.

(56) References Cited

U.S. PATENT DOCUMENTS

| | | | | |
|---|---|---|---|---|
| 2,582,514 A | * | 1/1952 | Swisher | A01M 29/06 428/16 |
| 5,168,649 A | * | 12/1992 | Wright | A01M 31/06 43/2 |
| 5,515,637 A | * | 5/1996 | Johnson | A01M 31/06 43/2 |
| 7,694,451 B1 | | 4/2010 | Zink | |
| 7,716,866 B2 | | 5/2010 | Zink | |
| 7,784,213 B1 | * | 8/2010 | Primos | A01M 31/06 43/2 |
| D628,264 S | * | 11/2010 | Hale | D22/125 |
| 2001/0004812 A1 | * | 6/2001 | Lindaman | A01M 31/06 43/2 |
| 2007/0151139 A1 | * | 7/2007 | O'Dell | A01M 31/06 43/2 |
| 2010/0115818 A1 | * | 5/2010 | Rogers | A01M 31/06 43/2 |
| 2012/0167445 A1 | * | 7/2012 | Samaras | A01M 31/06 43/2 |
| 2012/0180371 A1 | * | 7/2012 | Roe | A01M 31/06 43/3 |
| 2013/0247441 A1 | * | 9/2013 | Bellamy | A01M 31/06 43/2 |
| 2015/0208641 A1 | * | 7/2015 | Gurner, III | A01M 31/06 43/2 |
| 2015/0223447 A1 | * | 8/2015 | Miller | A01M 31/06 43/2 |
| 2016/0249601 A1 | * | 9/2016 | Cagle | A01M 31/06 43/2 |

* cited by examiner

*Primary Examiner* — Claude J Brown
(74) *Attorney, Agent, or Firm* — Wright Lindsey Jennings, LLP; Meredith K. Lowry

(57) ABSTRACT

A wildfowl decoy having two opposing heads, one head demonstrating an aggressive posture and the opposing head demonstrating a submissive posture.

20 Claims, 10 Drawing Sheets
(4 of 10 Drawing Sheet(s) Filed in Color)

DUAL HEADED WILDFOWL DECOY

CROSS-REFERENCE TO RELATED APPLICATIONS

This application claims priority to and is a continuation-in-part of U.S. Provisional Patent Application Ser. No. 62/379,000 filed on Aug. 24, 2016, the disclosure of which is hereby incorporated by reference herein in its entirety.

STATEMENT REGARDING FEDERALLY SPONSORED RESEARCH OR DEVELOPMENT

Not applicable.

BACKGROUND OF THE INVENTION

The present invention relates generally to hunting equipment, and more particularly to a dual headed turkey decoy. The sport of hunting is a popular sport across the globe, including in the United States. Wildfowl hunting is one type of hunting that requires the use of certain technologies in order to increase the hunter's likelihood of success in taking home game for that hunt. The use of wildfowl decoys, in particular, is necessary to attract wildfowl to the area being hunted. As technological abilities increase and hunting becomes more popular, wildfowl decoys are being improved and developed to better aid in the hunt.

Decoys are designed to mimic real wildfowl. However, the characteristics of wildfowl differ from bird to bird. Some wildfowl respond better, or are attracted to, an aggressive posture on a decoy. Other wildfowl respond better to a submissive posture on a decoy. Therefore, there is a need to present multiple characteristics of wildfowl when hunting.

BRIEF SUMMARY OF THE INVENTION

The present invention relates generally to hunting equipment, and more particularly to a mounted wildfowl decoy having two opposing heads, one depicting an aggressive posture wildfowl and the other depicting a submissive posture wildfowl. The decoy is mounted on a pole is used so that a decoy can be positioned as if standing. The present invention is directed to a dual-headed decoy providing two heads to attract wildfowl.

These and other features, objects and advantages of the present invention will become better understood from a consideration of the following detailed description of the preferred embodiments and appended claims in conjunction with the drawings as described following:

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 6:
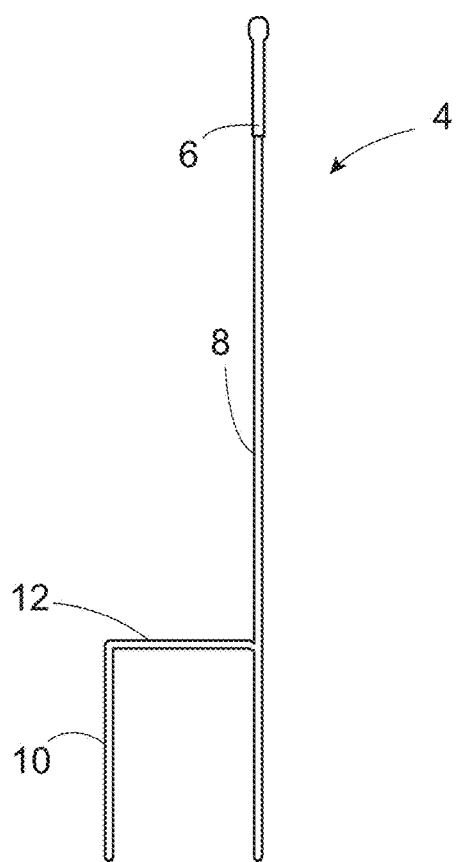
FIG. 6 is front side view of the mounting pole for the present invention.

Turning to the figures, the present invention may be described. In one embodiment the present invention is directed to a three-dimensional wildfowl decoy apparatus 2 designed to be mounted by a pole 4 (shown in FIG. 6). In general, the present invention is an ovoid structure having a top, bottom, front, back, left and right side. As shown, the front and back sides are substantially similar, each having a decoy head on the side such that the decoy heads are on opposite sides of the body.

In one embodiment the present invention has a decoy 2 with a central body 14 having two hemispheres, a front hemisphere 16 and a back hemisphere 18. The central body 14 has a realistic exterior that resembles a wild bird in detail. The body 14 is molded with feathering and may also have live turkey feathers added to the body 14. The body 14 is painted with the central body being distinct from the head portions, discussed below.

The central body 14 is equally divided into the two opposing hemispheres 16, 18, divided along a plane extending along a centerline of the central body and shown along line 4-4 (shown in FIG. 4) from the top of the body 14 extending from the right side of the decoy to the left side of the decoy 2 and shown along line 1-1 (shown in FIG. 1) from the right side of the decoy 2 extending from the base 36 of the decoy 2 to the top 38. Each hemisphere 16, 18 presents a back and body feathers portion, decoy head 20, 22 attached to a decoy breast portion 24, 26 having a textured appearance 52 to simulate the body of a feathered front of a wildfowl. The decoy head 20, 22 is positioned with the base of the head 44, the base of the major caruncles, proximate the center of the central body 14.

The two hemispheres 16, 18 present differing visages on each head 20, 22 for the decoy and each oriented in opposite to the other.

Figure 7:
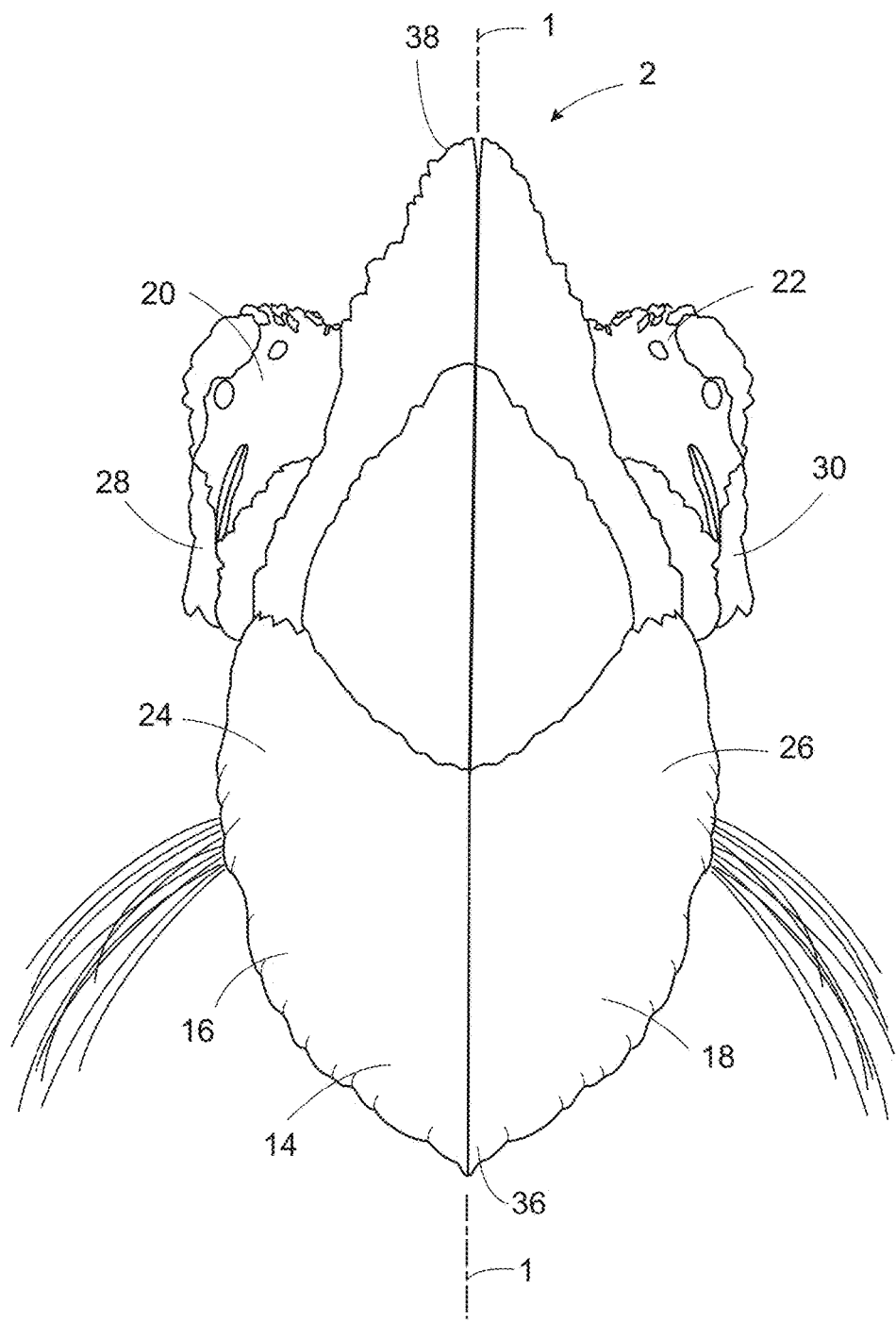
FIG. 7 is a front side view of the present invention, showing the two heads.
Figure 8:
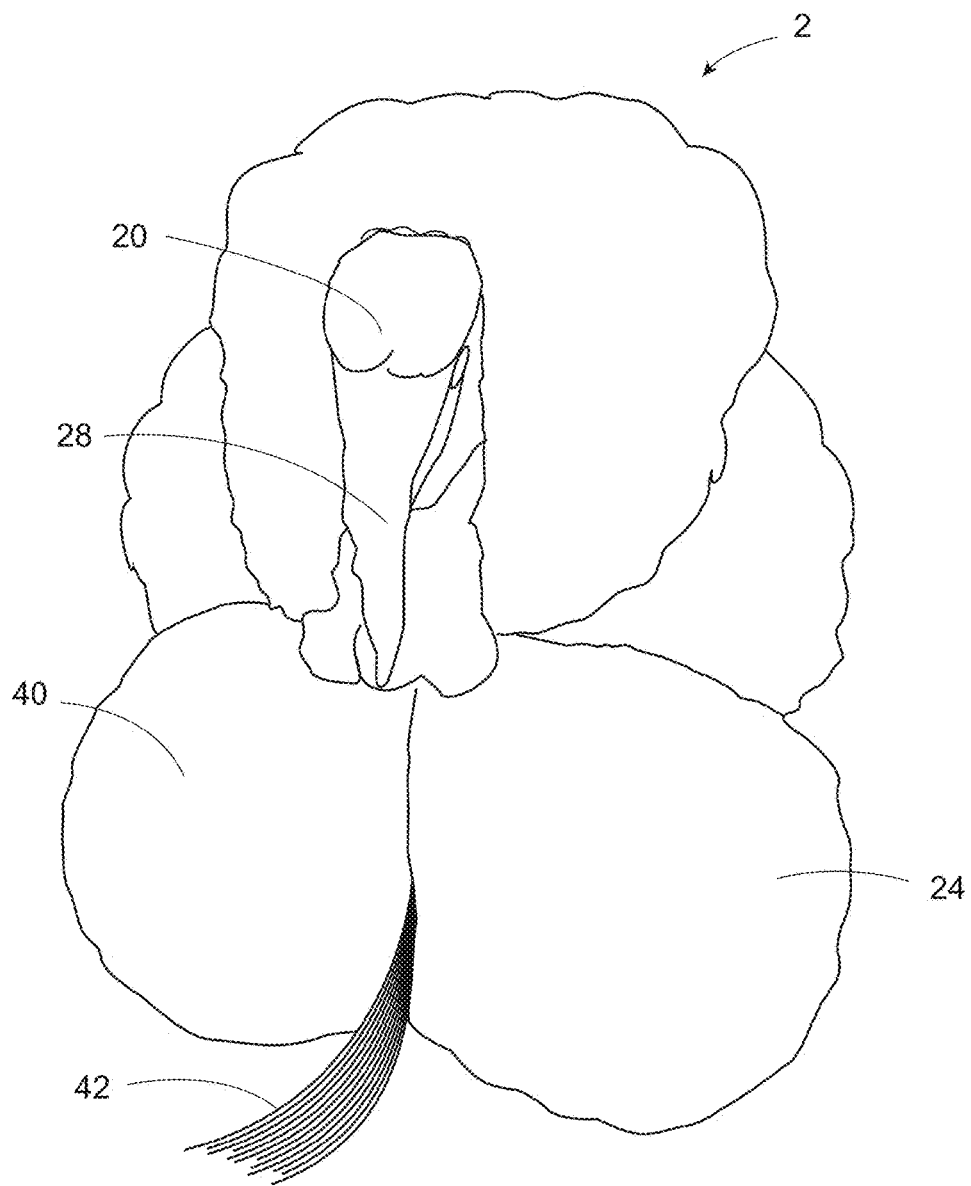
FIG. 8 is a left side view of the present invention.
Figure 9:
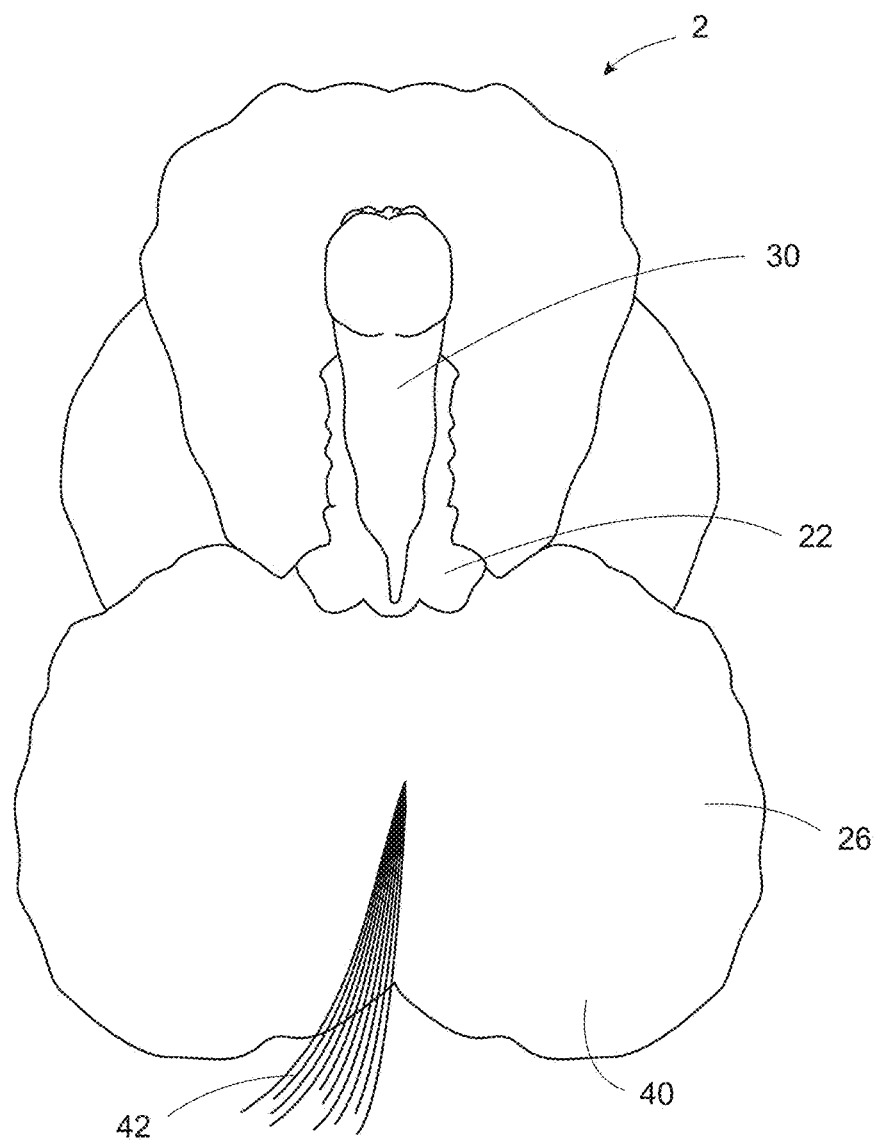
FIG. 9 is a right side view of the present invention.
Figure 10:
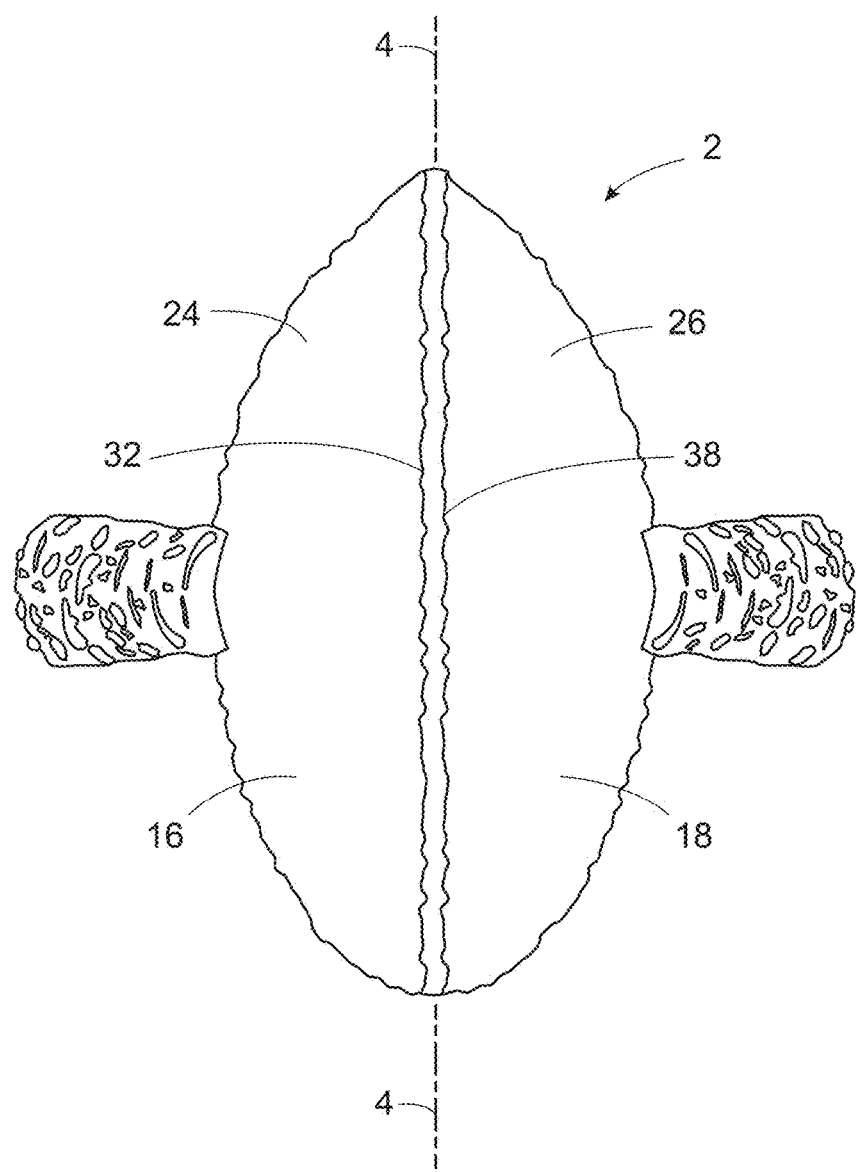
FIG. 10 is a top view of the present invention.

In particular, the present invention is directed to a turkey decoy having an aggressive visage 28 located on one hemisphere 16 and a submissive visage 30 located on the opposite hemisphere 18. For example, the front hemisphere 16 may present the aggressive visage 28 and the back hemisphere 18 may present the submissive visage. The visages 28, 30 may be colored with realistic colors to simulate aggressive and submissive turkeys. As shown in FIGS. 1-4, for example, the aggressive visage may include red major caruncles and snood 46 or be substantially red-based color while the passive visage is substantially blue-based color or blue-gray color. The colors of the aggressive visage and passive visage are shown in FIG. 7 of the drawings. Other areas of the heads may include color or have other variations, but in general the aggressive visage will include substantially red markings while the passive visage will include substantially blue or gray markings.

Figure 1:
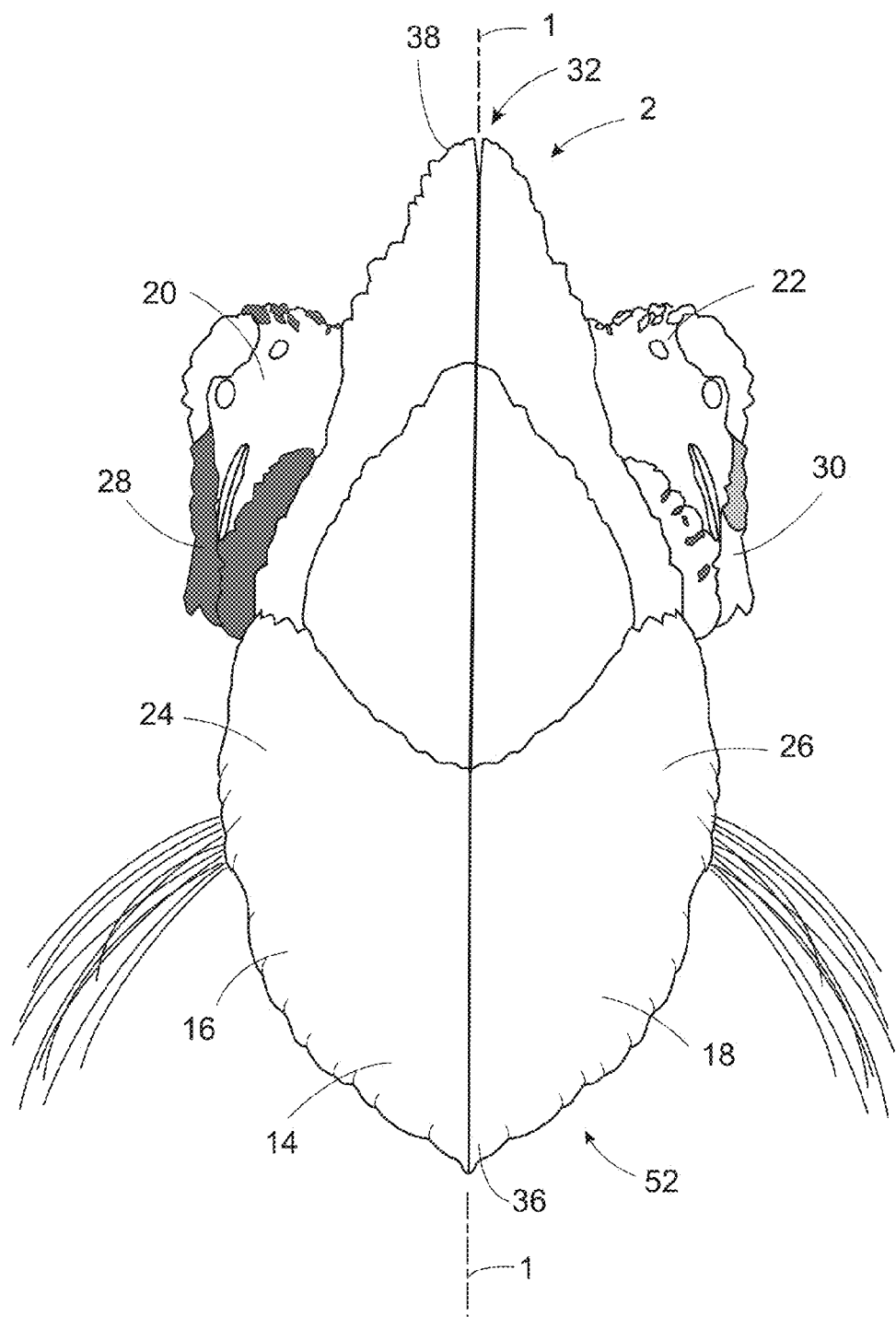
FIG. 1 is a front side view of the present invention, showing the two heads.

As shown in FIG. 1, the two hemispheres 16, 18 are partially joined along line 1-1 from the right side of the decoy 2. As discussed below, the hemispheres 16, 18 are partially separated with an aperture 32 at the top 38 of the decoy 2 to allow for insertion of tail feathers. However, the hemispheres 16, 28 are substantially connected along line 1-1. Along line 1-1, as shown, the body 14 for each hemisphere 16, 18 is substantially a mirror image of the other, with each body hemisphere 16, 18 connected to the other at the broadest part of the body 14.

Figure 2:
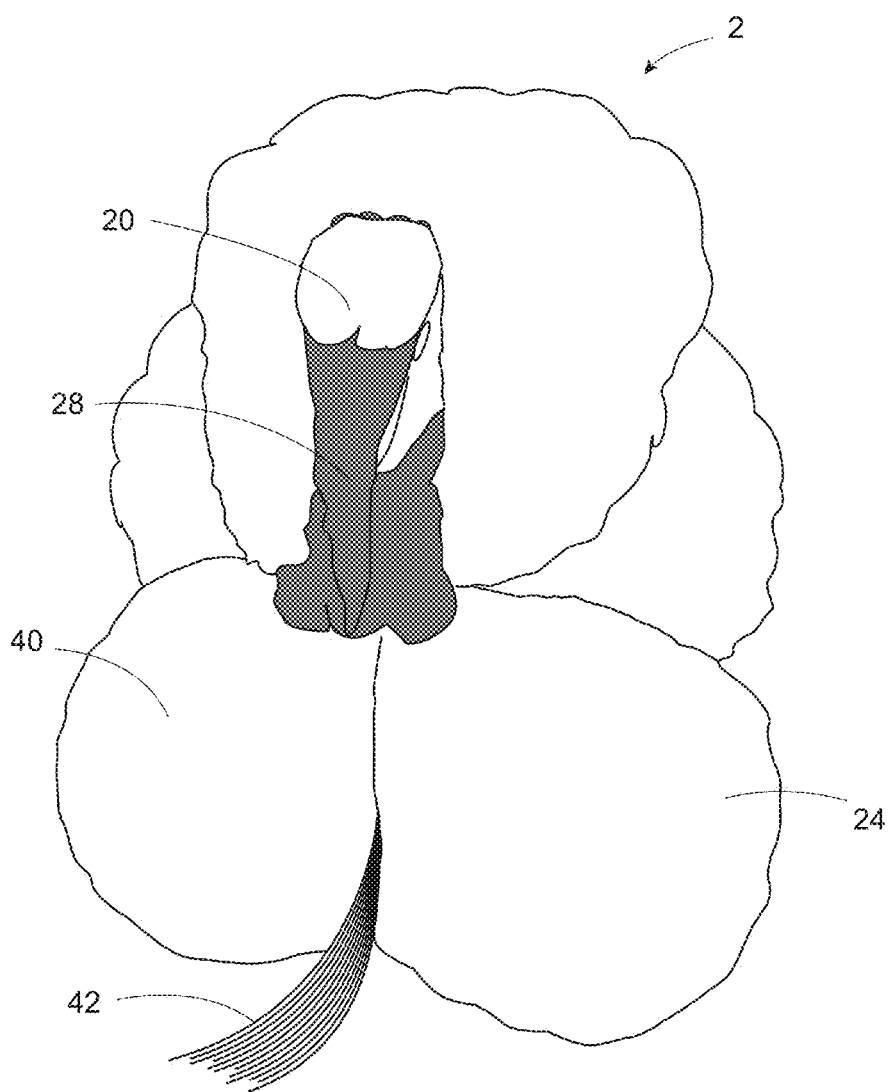
FIG. 2 is a left side view of the present invention.

As shown in FIG. 2, the aggressive visage 28 is presented with the head 20 proximate the central portion of the body 14 above the breast feathers 40 and the beard 42.

Figure 3:
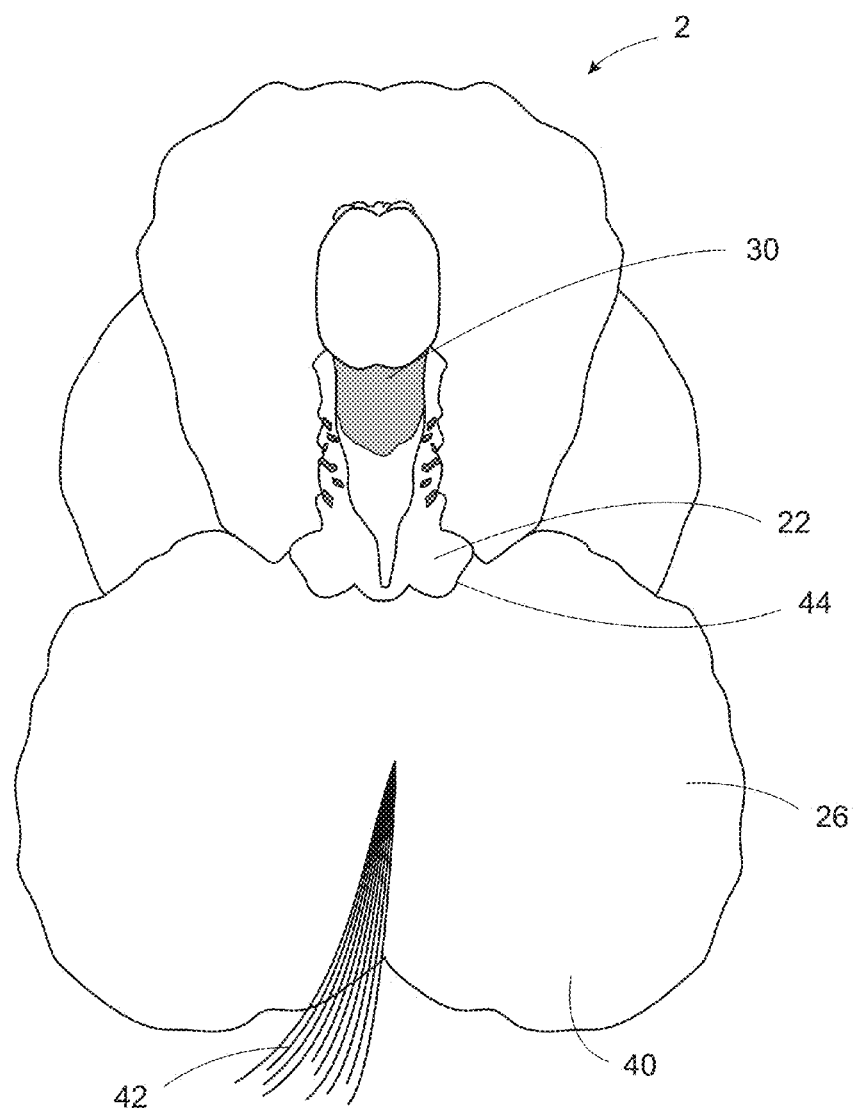
FIG. 3 is a right side view of the present invention.

As shown in FIG. 3, the passive visage 30 is presented with the head 22 proximate the central portion of the body 14 above the breast feathers 40 and the beard 42.

Figure 4:
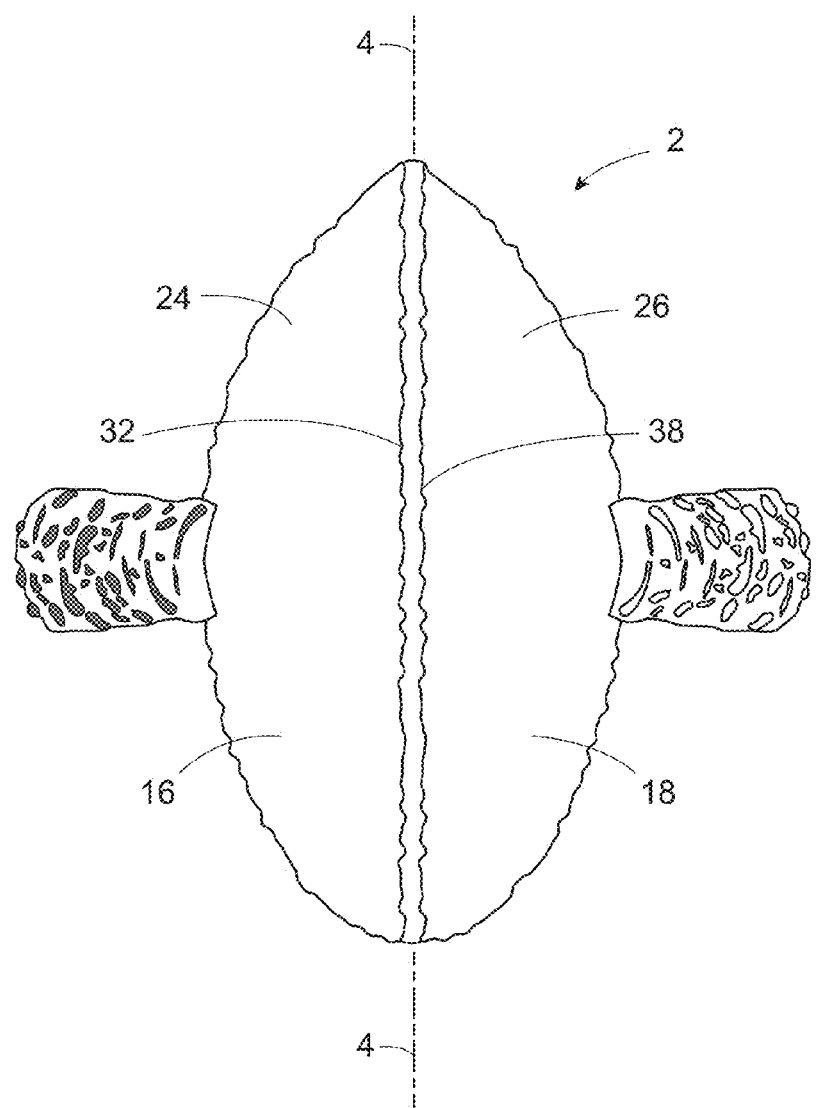
FIG. 4 is a top view of the present invention.
Figure 5:
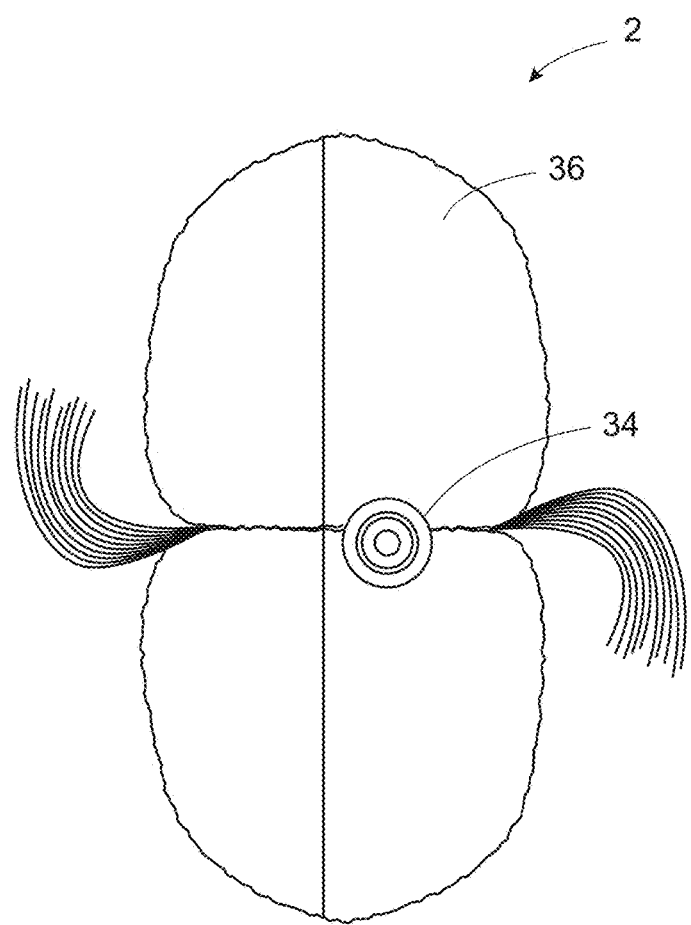
FIG. 5 is a bottom view of the present invention.

The tail fan of the turkey may be added to the decoy 2 through attachment within the decoy 2 along line 4-4. As shown in FIG. 4, an aperture 32 extending along line 4-4 from the left side of the decoy to the right side of the decoy allows for the insertion of a real or artificial tail fan (not shown) in a spread out orientation or compact orientation. The aperture 32 is configured to hold the tail fan between the two hemispheres 16, 18 and providing a tail fan for each side of the decoy 2.

The decoy has a mounting aperture 34 on the bottom of the decoy that allows for mounting into the decoy 2. The mounting pole 4 has an attachment sleeve 6, which increases the circumference of the pole 4 for mounting within the decoy 2, an elongated shaft 8 extending a length, and a supporting leg 10 connected to the elongated shaft 8 by a connecting member 12. The elongated shaft 8 and supporting leg 10 taper to pointed ends 14 to allow for easy deployment into the ground. The top of the attachment sleeve 6 has a concave point.

The mounting pole 4 allows the decoy 2 to move in relation to the pole 4 by rotating around the pole 4 as the axis. The decoy 2 rests on the concave top of the pole 4 to allow it to move in the wind.

Unless otherwise stated, all technical and scientific terms used herein have the same meaning as commonly understood by one of ordinary skill in the art to which this invention belongs. Although any systems and materials similar or equivalent to those described herein can also be used in the practice or testing of the present invention, a limited number of the exemplary systems and materials are described herein. It will be apparent to those skilled in the art that many more modifications are possible without departing from the invent concepts herein. All terms used herein should be interpreted in the broadest possible manner consistent with the context. Any ranges expressed herein are intended to include all particular values within the stated range, as well as all sub-ranges that fall within the stated range.

What is claimed is:

1. A three-dimensional wild fowl decoy comprising:
   a central body divided into a front hemisphere and a back hemisphere, each hemisphere having a decoy breast, said decoy breast having a textured appearance to simulate a body of a wild fowl;
   a first head secured to said front hemisphere, said first head having an aggressive wild fowl visage;
   a second head secured to said back hemisphere, said second head having a submissive wild fowl visage; and
   an aperture configured to retain tail feathers of a wild fowl, said aperture extending from one side of said central body to an opposing side of said central body between said front hemisphere and said back hemisphere.

2. The decoy of claim 1, wherein said first head is presented proximate to a center of said front hemisphere.

3. The decoy of claim 2, wherein said second head is presented proximate to a center of said back hemisphere.

4. The decoy of claim 1, wherein said first hemisphere is substantially a mirror image of said back hemisphere.

5. The decoy of claim 1 further comprising a mounting aperture at a base of said central body.

6. The decoy of claim 1 further comprising a beard secured to said decoy breast portion.

7. A three-dimensional wild fowl decoy comprising:
   a central body divided into a first hemisphere and a second hemisphere, each hemisphere having a decoy breast, said decoy breast having a textured appearance to simulate a body of a wild fowl;
   a first head secured to said first hemisphere with a base of said first head positioned proximate a center of said first hemisphere, said first head having an aggressive wild fowl visage;
   a second head secured to said second hemisphere with the base of said second head positioned proximate the center of said second hemisphere, said second head having a submissive wild fowl visage; and
   an aperture configured to retain tail feathers of a wild fowl, said aperture extending from one side of said central body to an opposing side of said central body between said first hemisphere and said second hemisphere.

8. The decoy of claim 7, wherein said first hemisphere is substantially a mirror image of said back hemisphere.

9. The decoy of claim 7 further comprising a mounting aperture at the base of said central body.

10. The decoy of claim 7 further comprising a beard secured to said decoy breast portion.

11. A three-dimensional wild fowl decoy comprising:
    a central body divided about a plane extending along a centerline of said central body into two opposing portions, a first portion and a second portion, said second portion being a substantial mirror image of said first portion and each opposing portion having a breast portion and back portion, said breast portion having a textured appearance to simulate the body of a wild fowl;
    a first head secured to said first presented proximate to a center of said first portion; and
    a second head secured to said second portion, said second head presented proximate to the center of said second portion.

12. The decoy of claim 11, wherein said first head has an aggressive wild fowl visage.

13. The decoy of claim 12, wherein said first head includes a red-based color.

14. The decoy of claim 11, wherein said second head has a submissive wild fowl visage.

15. The decoy of claim 14, wherein said second head includes a blue-based color.

16. The decoy of claim 14, wherein said second head includes a gray-based color.

17. The decoy of claim 11, wherein said first portion is substantially a mirror image of said back portion.

18. The decoy of claim 11 further comprising a mounting aperture at a base of said central body.

19. The decoy of claim 11 further comprising an aperture configured to retain tail feathers of a wild fowl, said aperture extending from one side of said central body to the opposing side of said central body between said first portion and said second portion.

20. The decoy of claim 11 further comprising a beard secured to said breast portion.

\* \* \* \* \*